United States Patent
Stahl

(10) Patent No.: US 7,072,932 B1
(45) Date of Patent: Jul. 4, 2006

(54) PERSONALIZED NETWORK-BASED SERVICES

(75) Inventor: David R. Stahl, Bedminster, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 987 days.

(21) Appl. No.: 09/383,857

(22) Filed: Aug. 26, 1999

(51) Int. Cl.
*G06F 15/16* (2006.01)
(52) U.S. Cl. ............... 709/203; 709/218; 709/219
(58) Field of Classification Search .......... 707/217, 707/218, 236, 245, 219, 231, 207, 206, 240, 707/203
See application file for complete search history.

(56) References Cited

U.S. PATENT DOCUMENTS

| | | | | |
|---|---|---|---|---|
| 6,049,831 | A * | 4/2000 | Gardell et al. | 709/236 |
| 6,101,537 | A * | 8/2000 | Edelstein et al. | 709/219 |
| 6,195,692 | B1 * | 2/2001 | Hsu | 709/219 |
| 6,205,485 | B1 * | 3/2001 | Kikinis | 709/231 |
| 6,240,448 | B1 * | 5/2001 | Imielinski et al. | 709/218 |
| 6,317,779 | B1 * | 11/2001 | Gile et al. | 709/217 |
| 6,360,275 | B1 * | 3/2002 | Chu et al. | 709/245 |
| 6,421,717 | B1 * | 7/2002 | Kloba et al. | 709/219 |

* cited by examiner

Primary Examiner—William Bashore
Assistant Examiner—Chau Nguyen

(57) ABSTRACT

A network-based service where different sets of customized information are delivered to a user at different times to different destinations (i.e., different user devices) selected by the user. More particularly, a user accesses a network-based server, generally owned by a network service provider and defines a user profile which specifies the information or other content to be made available. The user may request that the information be delivered later automatically or be made available on demand. The user has flexibility in requesting a particular format to receive the information on demand. In case of the later delivery, the user requests specified times in a form of a schedule and specified destinations (i.e., user devices) for the delivery of the information. The user also has flexibility in selecting the format for the delivery of information. Sometimes, the format is dictated by the selection of a user device, e.g., the selection of a radio implies audio format, and the selection of a television implies video format. However, some user devices are capable of receiving information in more than one format, e.g., a computer may have the capability to receive information in audio, video, or text format. Depending on the implementation, one or more customized sets of information are delivered to one or more user devices as a function of the specified format or the specified time or both.

22 Claims, 3 Drawing Sheets

PERSONALIZED NETWORK-BASED SERVICES

BACKGROUND OF THE INVENTION

1. Field of the Invention

The present invention relates to computer networks, such as the Internet, and, in particular, to receiving and storing customized sets of information from various network-based information services.

2. Description of the Related Art

Computer networks, such as the Internet, enable users to access an almost unlimited amount of information. Web browsers, network search tools, and software agents assist users in locating information available on the Internet.

A personal portal is a network search tool that defines a user profile specifying the information to be collected and the other services requested by the user. For example, a particular user may be interested in the current prices of specific stocks that he owns, the latest scores for his favorite sports teams, his daily horoscope, the weather report for his home town, and his favorite music. For such user, personal portal services are being provided by a number of Internet service providers. When a user of a personal portal accesses his/her personal portal, the Internet service provider then automatically accesses the latest information from various sources and presents this information to the user.

Traditional web portals allow users to specify customized sets of information in user profiles. They provide little flexibility, however, in selecting the format for such information. The customized information is usually presented to the users only as a computer display in a predefined composite format.

SUMMARY OF THE INVENTION

The present invention is directed to a network-based service where different sets of customized information are delivered to a user at different times to different destinations (i.e., different user devices) selected by the user. For example, a user may desire to have a customized set of information such as stock quotes and horoscopes delivered in an audio format to his Internet radio (i.e., a radio configured to receive audio information from the Internet). A user may also desire to have another or the same set of customized information delivered in a video format to his Internet television (i.e., a television set configured to receive video information from the Internet).

In accordance with the principles of the present invention, a user accesses a network-based server, generally owned by a network service provider, and defines a user profile which specifies the information or other contents to be made available. The user may request that the information be delivered later automatically or be made available on demand. The user has flexibility in requesting a particular destination and format to receive the information on demand. In case of the later delivery, the user requests specified times in a form of a schedule and specified destinations (i.e., user devices) for the delivery of the information. The user also has flexibility in selecting the format for the delivery of information. Sometimes, the format is dictated by the selection of user device, e.g., the selection of an Internet radio implies audio format, and selection of an Internet television implies video format. However, some user devices are capable of receiving information in more than one format, e.g., a computer may have the capability to receive information in audio, video, or text format. Depending on the implementation, one or more customized sets of information are delivered to one or more user devices as a function of the specified format or the specified time or both.

In one embodiment, the present invention is a network-based server configured to provide access to a user via an input port through which one or more customized sets of information are requested. The network-based server also comprises a processor that collects the requested sets of information from a single or a plurality of sources. Then, at specified times, these customized sets of information are delivered via an output port to one or more user devices in formats selected by the user. In this embodiment, a personal computer, an Internet radio, an Internet television, and other compatible appliances are possible user devices. The customized information may be gathered for the user in real time or may be pre-fetched and queued to be delivered at the specified time or may be a combination of both where some of the information is pre-fetched and some of the information is gathered in real time. Depending on the implementation, the customized information and the format may be modified according to some pre-specified changes or may be modified according to manual changes requested by the user.

In another embodiment, the present invention is a method for presenting information to a user accessing a network-based service provider, comprising two phases. The first phase comprises the steps of creating a user profile that defines a schedule of one or more information requests, each information request having a specified destination (i.e., a user device). The second phase comprises the steps of (a) providing for the user profile; (b) preparing one or more information sets corresponding to the user profile; and (c) automatically delivering the requested information to the corresponding destination at a time based on the schedule. The method may include the optional step of converting one or more information sets to the formats desired by the user. In this embodiment, the method may also include the steps of automatically modifying the user profile according to some pre-specified changes and then using the modified user profile to gather the information for presentation to the user. These changes may also be manually requested by the user.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
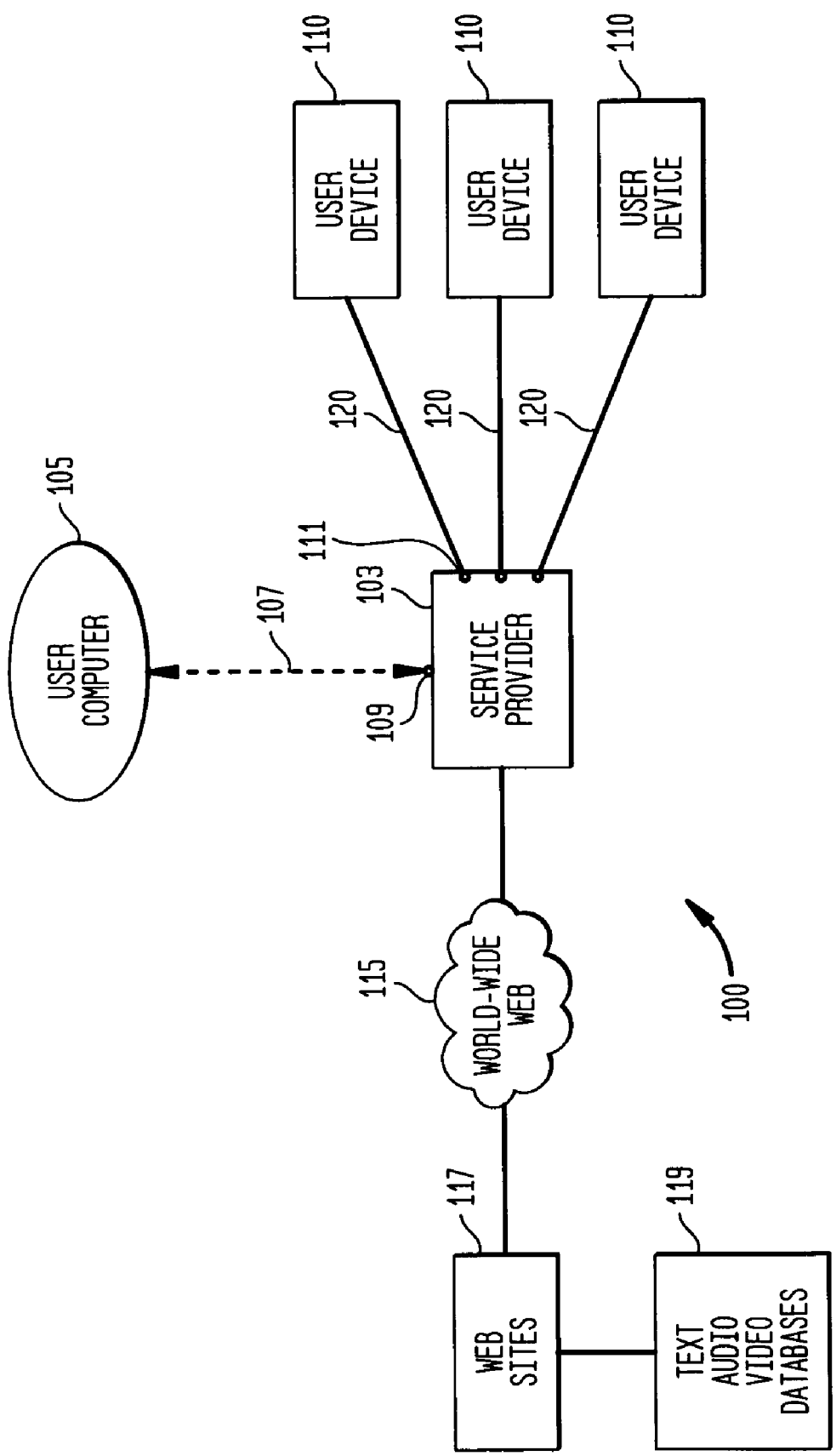
FIG. 1 is a block diagram illustrating various components in accordance with one embodiment of the present invention.

The present invention is directed to a network-based service wherein one or more customized sets of information requested by a user are delivered to the user at specified times in specified formats.

A user profile in accordance with the present invention is a network-based data file that specifies the services that are to be made available or automatically delivered to the user in specified formats at specified times. For example, a user may create a user profile which requests that on weekdays, local weather reports and traffic reports should be delivered to his Internet radio every morning at 6:00 AM; and on weekends, only the weather report should be delivered to his Internet television at 10:00 AM. The user profile may include more than one set of information requests. In our example, the user profile may also include a request for stock market information, videos, audio tracks and other current news to be delivered at 2:00 PM everyday to his office computer.

According to the principles of the present invention, first, a user creates a user profile which includes requests for one or more customized sets of information. The user profile also specifies a preferred format and preferred time for delivery of each set of information. The information requests may include, for example, news (e.g., international, financial, technology, local, sports), weather reports, traffic reports, daily calendar, reminders (e.g., birthdays, anniversaries), and music (e.g., easy listening, classical, country). As the scope of network-based services expands, the information content may be expanded to include video-on-demand services (e.g., television programs, movies).

A network-based server usually owned and operated by a network-based service provider stores the user profile created and input by the user, and then at scheduled times, prepares and automatically delivers the requested sets of information to the specified user devices. The network-based server is configured to automatically deliver the requested information at the scheduled times, however, the user has flexibility in manually selecting the delivery time to be other than the scheduled time, e.g., user may randomly log on one morning and request his favorite music. The network-based server is capable of delivering such information on demand.

Analogously, the user has flexibility in making other changes to the user profile, e.g., the user may randomly log on and request changes to the fact that on Tuesday, the information should be sent to his computer rather than to his Internet radio. Alternatively, the user may select a format other than the pre-specified format, e.g., on Wednesday, the information should be sent to his hotel room on his lap-top computer in a text format.

During the preparation of each information set, the requested information is collected from one or more sources, e.g., various informational databases connected to the network. The information contents may also be fetched from existing radio stations, television stations, video servers, wirelines, recordings, cable TV, etc.

After collecting one or more customized information sets, if necessary, the network-based server converts the format of the information sets to the formats desired by the user, e.g., text information may be converted to an audio format via suitable text-to-audio converters. The conversion step is optional as, generally, the information is collected from one or more databases in the desired format and no conversion is required.

Then, at the specified times, if necessary, a connection is established between the service provider and the specified user devices. One or more information sets are then delivered from the service provider to the user devices.

The principles of the present invention provide users and/or service providers flexibility to improve upon the existing services. To improve the quality of audio, the downloaded data may be coded by using well-known compression techniques. Cache servers may also be placed in the network to create play-out buffers and to cache frequently accessed contents.

The user may also have the option of doing remote administration via a telephone interface. For example, if the user is away from home, the user may call a telephone number to direct the user's information to a different user device. The user may also call a telephone number to request that all or a part of the audio portion of an information set be played over the telephone line.

The principles of the invention may be further used to enhance the existing services provided by the service provider, e.g., the user may request specific for-a-fee content such as training classes, movies, etc.

FIG. 1 is a block diagram of one embodiment 100 of the present invention. In this embodiment, the principles of the present invention are illustrated in the context of Internet-based services.

A user of a network-based service in accordance with the principles of the present invention is connected to an input port 109 of a service provider 103 via a user computer 105, e.g., a personal computer or similar device used for accessing the Internet. Service provider 103 may be any vendor providing network-based personalized services. In general, such service provider will be an Internet service provider 103, hereafter ISP 103. Interconnection 107 between ISP 103 and user computer 105 may be a land-line connection or a wireless connection.

The user also has at least one user device 110, e.g., an Internet-ready appliance or computer, which is connected to an output port 111 of ISP 103 via interconnection 120. Each interconnection 120 may be a land-line link or a wireless link. For faster speed, interconnection 120 may be an XDSL link. In case of video transmission, interconnection 120 may be a cable link. Interconnection 120 is herein described in broad context including any converter box and any other equipment required to receive a transmission from ISP 103. ISP 103 is further connected to world-wide web 115, or other sources on the Internet.

This connectivity between ISP 103 and web 115 permits ISP 103 to collect the information from various other web sites 117 and databases 119 connected to web 115.

Initially, the user connects to ISP 103 via user computer 105 and creates a user profile comprising one or more sets of information requests. For each set of information requests, the user also specifies a preferred format and a preferred time for the delivery of information to a corresponding user device 110. The user has flexibility in choosing how to create this user profile. In one implementation, the user is presented with a series of graphical user interfaces (GUIs) on user computer 105 asking the user to enter or select preferences corresponding to different types of information.

ISP 103 receives the user profile and begins to prepare customized information requested in the user profile. During the preparation of the customized information, ISP 103 may utilize a plurality of databases 119 connected to world-wide web 115. Databases 119 include text, audio, and video databases. In an exemplary case, the following databases may be used:

A news database that provides a summary of current news;

A training and reference database that provides various local training and/or reference services;

A communications database that provides web-based radio and/or television programming;

A video-on-demand database that provides videos on demand;

A music database that provides different music; and

A communicator database that provides alerts of special events or items requiring attention.

After the customized information has been prepared for the user, if necessary it is changed to the format specified in the user profile. The conversion step is optional, as generally, the information is gathered from the corresponding databases in the desired format. After the information has been changed to the desired format, it is delivered to the specified user device 110 in the specified format at the specified time. As described before, the information may be gathered in real time, or pre-fetched and queued, or a combination of both where some of the information is gathered in real time and some of the information is pre-fetched.

Figure 2:
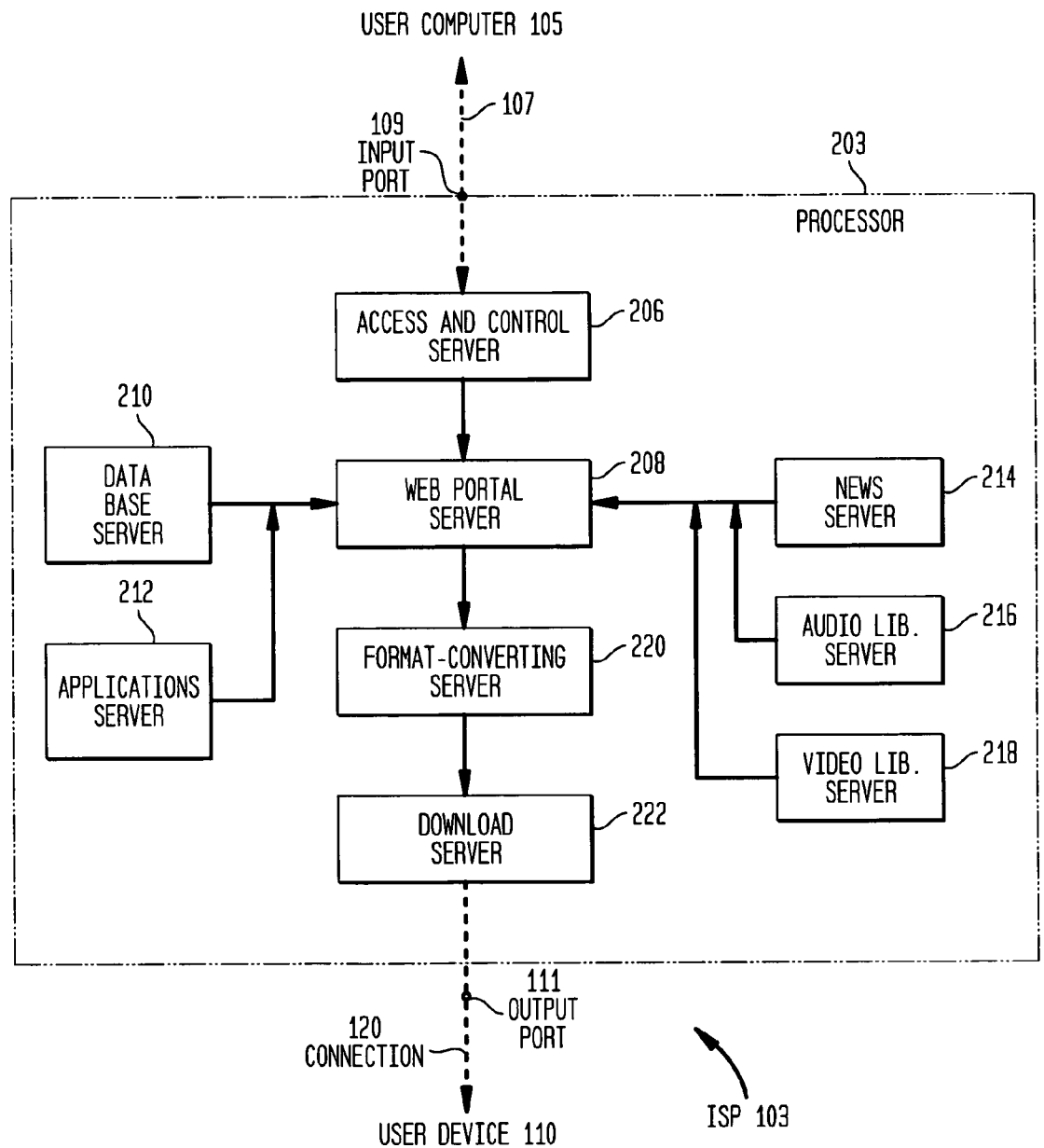
FIG. 2 shows a block diagram of the network connections for service provider of FIG. 1 according to one embodiment of the present invention.

FIG. 2 shows a block diagram of the network connections for service provider 103 of FIG. 1 according to one embodiment of the present invention. As shown in FIG. 2, the user accesses ISP 103 via computer device 105 which is connected to input port 109 of ISP 103 via interconnection 107. In FIG. 2, ISP 103 is shown to have input port 109, output port 111, and a processor 203. Processor 203 comprises an access and control server 206, a web portal server 208, a database server 210, an applications server 212, a news server 214, an audio library server 216, a video library server 218, a format-converting server 220, and a download server 222. Access and control server 206 implements a user registration system to manage and control the user's access to the network.

The user generates a user profile by using the web portal server 208. The user profile specifies the list of information requests, and preferred formats and times for delivery of the information satisfying these requests. The user profile is stored either on access and control server 206 or on web portal server 208. Web portal server 208 executes the information requests and gathers the information, as appropriate, from a plurality of available servers including database server 210, application server 212, news server 214, audio library server 216, and video library server 218. Database server 210 accesses available informational databases on the web organized by time, location, organization, category, and author. Application server 212 provides integrated management applications, interfaces to legacy systems, and business applications. News server 214 provides a database of news-related information organized by time, location, company, categories, and industry. Audio library server 216 provides pre-recorded audio information, e.g., music, talk-radio, etc. Video library server 218 provides video information services including video-on-demand.

ISP 103 also comprises a format-converting server 220 which facilitates the preparation of the desired information in the format specified by the user in the user profile. Format-converting server 220 may comprise text-to-audio and audio-to-text converters or some other comparable equipment.

Download server 222 is responsible for delivering customized information to the appropriate user device 110. Download server 222 also acts as a storage device where information may be stored until a connection to user device 110 has been established. Download server 222 is directly connected to output port 111 which is further connected to user device 110 via interconnection 120.

In the network configuration of FIG. 2, most if not all of the intelligence may be resident on the network side of network connections 107 and 120. As such, the sophistication required at the user end is minimal, thereby enabling the use of relatively simple and inexpensive user equipment.

Figure 3:
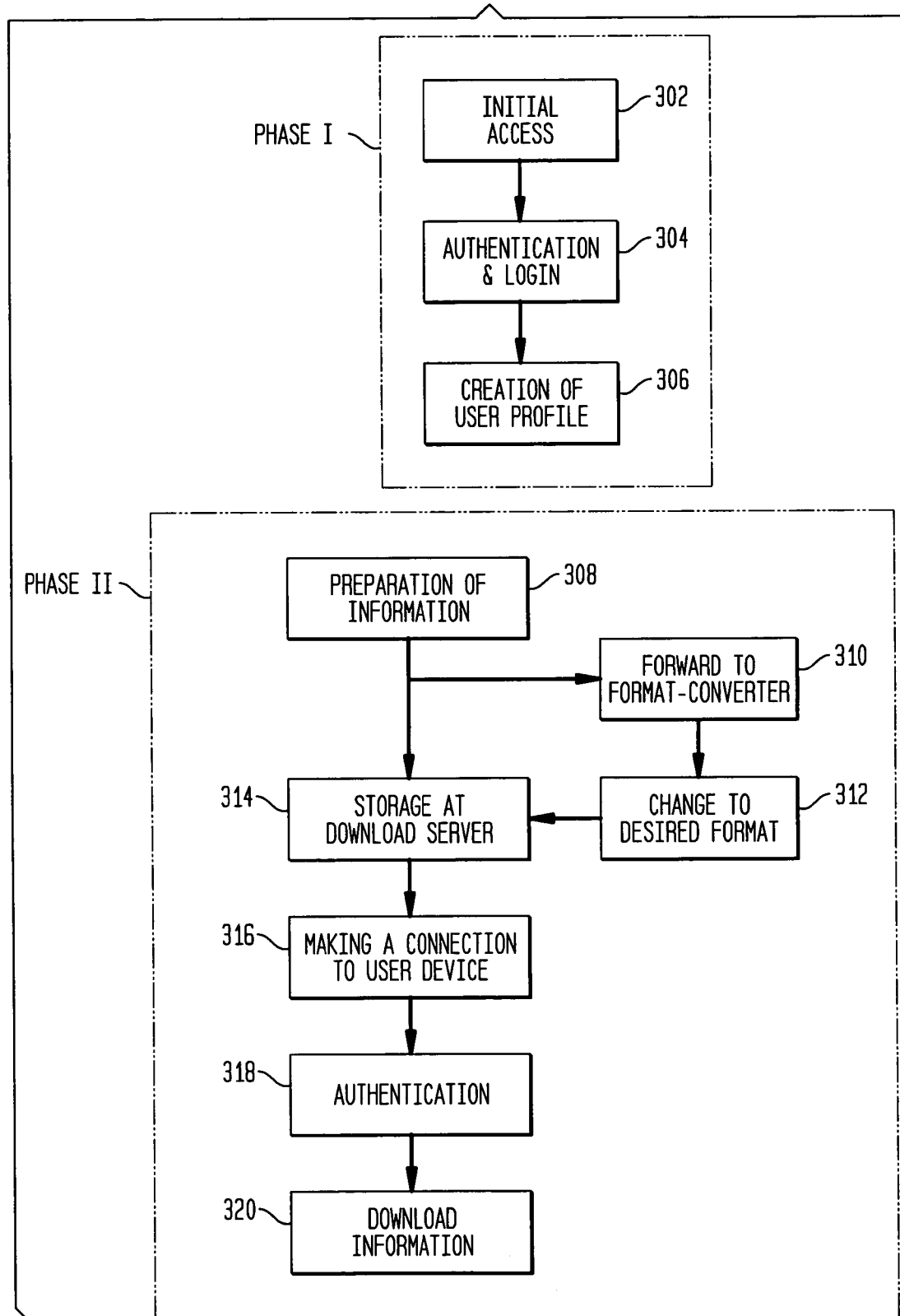
FIG. 3 shows a flow diagram representing exemplary processing implemented at a user end and at a service provider end.

FIG. 3 shows a flow diagram representing exemplary processing implemented at user computer 105 and at ISP 103. The exemplary processing is accomplished in two phases. In the first phase, the user initiates access to ISP 103 via computer device 105. When the user initiates access to ISP 103 (block 302), access and control server 206 authenticates the user and login information for access to the network (block 304). After initial access and authentication, the user creates a user profile (block 306). The user profile includes requests for one or more sets of information as well as specified times, specified user devices, and, if appropriate, specified formats to deliver the information.

In the second phase, web portal server 208 of FIG. 2 prepares information requested in the user profile (block 308). The information is gathered from one or more appropriate sources. The information is then forwarded to the download server 222 (block 314). Generally, the information is available in the format desired by the user, but occasionally information needs to be converted to a different format before it can be delivered to the user. In these latter cases, the information is first processed by format-converting server 220 (block 310). Format-converting server 220 changes the information to the specified format (block 312) and then forwards it to download server 222 (block 314).

Then, at the time specified by the user, if necessary, a connection is established between download server 222 and user device 110 (block 316). This step is optional as a permanent link may exist between download server 222 and user device 110. To establish this connection, ISP 103 places a call (i.e., a connection request) to user device 110. User device 110 (e.g., a radio or a television set configured to communicate with the service provider) may be connected to ISP 103 via a DSL telephone line, a broadband wireless connection, a cable, an ethernet, or a power-line connection. Therefore, the call may be a telephone call or a direct IP/http request.

After the call is established, ISP 103 matches the user's IP address or other identifying code to the user profile stored by the ISP (block 318). After authentication, information contents are downloaded to the specified user device (block 320).

Generally, ISP 103 places a call to user device 110 to create a connection. However, if user device 110 is an intelligent device, the call may be placed by user device 110 to ISP 103. In this case, user device 110 is programmed to contact ISP 103 at specified time to place a call.

The principles of the present invention are flexible. For example, the information contents may be downloaded in real-time or pre-fetched and queued on the download server to be downloaded at a specified time.

Generally, the first and second phases are not executed during a same ISP access session. A user may create his user profile days or even months in advance. However, it should be noted that the steps of the first and second phase may be executed in a sequence permitting the user to randomly access the network manually and request one or more sets of information.

The user has flexibility to change the selection of preferences and information requests in the user profile. In response, ISP 103 records and stores the updated user preferences for future use. For example, the user may select to change the specified time for the download of the information. The changes may be made in a variety of ways. For example, the user may access a calendar GUI (not shown) to select a year, month, and day corresponding to a new specified time. The user may select the specified time with even more precision (e.g., hours and minutes) by using a time-of-day field of the calendar.

The user may request changes in the selection of the user device, e.g., download information to a television, instead of a radio. The user also has flexibility in selecting a desired format of the information requested. Generally, the format is directly dependent on the particular user device 110. User device 110 can be any suitable type of equipment used for such a purpose including a computer terminal, a personal computer (PC), a portable laptop computer, a television set top box, a radio, or a personal data assistant (PDA). These examples include equipment that has a fixed location (e.g., a computer terminal, a PC, or a set top box) as well as mobile equipment whose location can vary over time (e.g., a laptop or a PDA). Analogously, the format can be audio, video, or text. Depending on the implementation, the user may have access to a pull-down menu where the user can just point and click at the specified format and select his choice.

Similarly, depending on the user device, interconnection 120 by which the information may be downloaded may be a permanent hard-wired link (e.g., computer network cabling or multi-media cable television service), a temporary hard-wired link (e.g., a phone line with a quick-connect jack to be plugged into a laptop or PDA with a modem), or a wireless connection.

The format may be chosen as an audio alarm or a video alarm. For example, a user may be particularly interested in news related to a particular stock. In those instances, as soon as the service provider receives any news related to that stock, it remotely generates an audio or video alarm.

Also, the principles of the invention include providing control capabilities to the user to control the delivery of the information. This is analogous to start/stop capabilities in a video recorder or in a video-on-demand service. Also, the information content may be (a) gathered before the specified time (pre-fetched and queued) or (b) gathered from its source database at the specified time and relayed to the user in real time. The user may have the capability to select which information is to be received in real time and which information is to be relayed in a pre-recorded form.

In addition to the embodiments described above, the present invention may be applied to a variety of other network configurations. For example, although the invention has been described in the context of Internets, such as the world-wide web, the invention can also be implemented in the context of other types of computer networks, including intranets. The present invention can also be implemented in the context of accessing a server that is not a part of a larger network.

It will be further understood that various changes in the details, materials, and arrangements of the parts which have been described and illustrated in order to explain the nature of this invention may be made by those skilled in the art without departing from the principle and scope of the invention as expressed in the following claims.

The invention claimed is:

1. A method for providing information over a computer network, comprising the steps of:
   (a) providing for a user profile, wherein the user profile defines a schedule of two or more information requests, each information request having a corresponding destination, including a first information request having a corresponding first destination and a second information request having a corresponding second destination different from the first destination;
   (b) preparing a set of information corresponding to each information request; and
   (c) automatically delivering each set of information to the corresponding destination at a time based on the schedule.

2. The invention of claim 1, wherein the corresponding destination for a particular information request is an Internet radio and the corresponding set of information has an audio format for rendering on the Internet radio.

3. The invention of claim 1, wherein the corresponding destination for a particular information request is an Internet television and the corresponding set of information has an audio/video format for rendering on the Internet television.

4. The invention of claim 1, wherein the corresponding destination for a particular information request is a personal computer and the corresponding set of information has at least one of an audio, a video, and a text format for rendering on the personal computer.

5. The invention of claim 1, wherein step (a) further comprises the step of presenting a computer-based interface for a user to define the user profile.

6. The invention of claim 1, wherein step (c) further comprises the step of initiating a connection to the corresponding destination over the computer network at the time based on the schedule.

7. The invention of claim 1, wherein each of the first and second destinations is an Internet radio, an Internet television, or a personal computer.

8. The invention of claim 1, wherein the sets of information for the first and second information requests are automatically delivered to the corresponding first and second destinations at different times based on the schedule.

9. The invention of claim 1, wherein step (b) further comprises the step of converting format of the set of information based on the corresponding destination.

10. The invention of claim 1, wherein step (b) further comprises the step of gathering the set of information from two or more different network-based sources of information.

11. The invention of claim 1, further comprising the step of providing a user with flexibility to modify the information requests or the corresponding destination or the schedule.

12. A server for providing information over a computer network, comprising:
   (a) an input port configured to receive a user profile, wherein the user profile defines a schedule of two or more information requests, each information request having a corresponding destination, including a first information request having a corresponding first destination and a second information request having a corresponding second destination different from the first destination;
   (b) a processor configured to prepare a set of information corresponding to each information request; and
   (c) an output port configured to automatically deliver each set of information to the corresponding destination at a time based on the schedule.

13. The invention of claim 12, wherein the corresponding destination for a particular information request is an Internet radio and the corresponding set of information has an audio format for rendering on the Internet radio.

14. The invention of claim 12, wherein the corresponding destination for a particular information request is an Internet television and the corresponding set of information has an audio/video format for rendering on the Internet television.

15. The invention of claim 12, wherein the corresponding destination for a particular information request is a personal computer and the corresponding set of information has at least one of an audio, a video, and a text format for rendering on the personal computer.

16. The invention of claim 12, wherein the input port is configured to present a computer-based interface for a user to define the user profile.

17. The invention of claim 12, wherein the output port is configured to initiate a connection to the corresponding destination over the computer network at the time based on the schedule.

18. The invention of claim 12, wherein each of the first and second destinations is an Internet radio, an Internet television, or a personal computer.

19. The invention of claim 18, wherein the sets of information for the first and second information requests are automatically delivered to the corresponding first and second destinations at different times based on the schedule.

20. The invention of claim 12, wherein the processor is configured to convert format of the set of information based on the corresponding destination.

21. The invention of claim 12, wherein the processor is configured to gather the set of information from two or more different network-based sources of information.

22. The invention of claim 12, the server is configured to provide user flexibility to modify the information requests or the corresponding destination or the schedule.

* * * * *